(12) United States Patent
Kuksenkov et al.

(10) Patent No.: US 11,067,735 B2
(45) Date of Patent: Jul. 20, 2021

(54) DIRECT-LIT BACKLIGHT UNIT WITH 2D LOCAL DIMMING

(71) Applicant: Corning Incorporated, Corning, NY (US)

(72) Inventors: Dmitri Vladislavovich Kuksenkov, Elmira, NY (US); David August Sniezek Loeber, Horseheads, NY (US); Xiang-Dong Mi, Pittsford, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 16/642,716

(22) PCT Filed: Aug. 28, 2018

(86) PCT No.: PCT/US2018/048404
§ 371 (c)(1),
(2) Date: Feb. 27, 2020

(87) PCT Pub. No.: WO2019/046340
PCT Pub. Date: Mar. 7, 2019

(65) Prior Publication Data
US 2020/0257035 A1    Aug. 13, 2020

Related U.S. Application Data

(60) Provisional application No. 62/551,493, filed on Aug. 29, 2017.

(51) Int. Cl.
*F21V 8/00*    (2006.01)
(52) U.S. Cl.
CPC ......... *G02B 6/0036* (2013.01); *G02B 6/0031* (2013.01); *G02B 6/0065* (2013.01)

(58) Field of Classification Search
None
See application file for complete search history.

(56) References Cited

U.S. PATENT DOCUMENTS

| | | | |
|---|---|---|---|
| 7,726,828 B2 | 6/2010 | Sato | |
| 8,625,063 B2 | 1/2014 | Tamaki et al. | |
| 9,952,375 B2 | 4/2018 | Nolan et al. | |
| 9,989,692 B2 | 6/2018 | Etienne et al. | |
| 2006/0256255 A1 | 11/2006 | Minami | |
| 2007/0070270 A1 | 3/2007 | Yu et al. | |
| 2009/0316072 A1 | 12/2009 | Okumura et al. | |
| 2013/0258709 A1 | 10/2013 | Thompson et al. | |
| 2014/0071658 A1 | 3/2014 | Weber et al. | |

(Continued)

FOREIGN PATENT DOCUMENTS

| | | |
|---|---|---|
| CN | 105065995 A | 11/2015 |
| WO | 2017106124 A2 | 6/2017 |

OTHER PUBLICATIONS

International Search Report and Written Opinion of the International Searching Authority; PCT/US2018/048404, dated Nov. 5, 2018; 11 Pages; ISA US Commissioner for Patents.

*Primary Examiner* — Vip Patel

(57) ABSTRACT

Backlight units include a light guide plate having a plurality of light extraction features, at least one light source optically coupled to a second major surface of the light guide plate, a rear reflector positioned proximate the second major surface, and a patterned reflective layer positioned proximate a first major surface of the light guide plate. Display and lighting devices comprising such backlight units are further disclosed.

21 Claims, 6 Drawing Sheets

(56) References Cited

U.S. PATENT DOCUMENTS

2014/0240828 A1 8/2014 Robinson et al.
2016/0370527 A1 12/2016 Chang et al.
2017/0052311 A1 2/2017 Lautenschlager et al.

DIRECT-LIT BACKLIGHT UNIT WITH 2D LOCAL DIMMING

CROSS-REFERENCE TO RELATED APPLICATIONS

This application claims the benefit of priority under 37 U.S.C. § 371 to International Patent Application No. PCT/US2018/048404 filed Aug. 28, 2018, which claims the benefit of priority under 35 U.S.C. § 119 to U.S. Provisional Patent Application No. 62/551,493, filed Aug. 29, 2017, the contents of all of which are relied upon and incorporated herein by reference in their entirety.

The disclosure relates generally to backlight units and display or lighting devices comprising such backlight units, and more particularly to backlight units comprising a patterned glass light guide plate and a patterned reflective layer.

BACKGROUND

Liquid crystal displays (LCDs) are commonly used in various electronics, such as cell phones, laptops, electronic tablets, televisions, and computer monitors. LCDs can comprise a backlight unit (BLU) for producing light that can then be converted, filtered, and/or polarized to produce the desired image. BLUs may be edge-lit, e.g., comprising a light source coupled to an edge of a light guide plate (LGP), or back-lit, e.g., comprising a two-dimensional array of light sources disposed behind the LCD panel.

Direct-lit BLUs may have the advantage of improved dynamic contrast as compared to edge-lit BLUs. For example, a display with a direct-lit BLU can independently adjust the brightness of each LED to optimize the dynamic range of the brightness across the image. This is commonly known as local dimming. However, to achieve desired light uniformity and/or to avoid hot spots in direct-lit BLUs, the light source(s) may be positioned at a distance from the light diffusing layer, thus making the overall display thickness greater than that of an edge-lit BLU. Lenses positioned over the LEDs have also been proposed to improve the lateral spread of light in direct-lit BLUs, but the optical distance between the LED and the diffusing layer in such configurations, e.g., from about 15-20 mm, still results in an undesirably high overall display thickness and/or these assemblies may produce undesirable optical losses as the BLU thickness is decreased. While edge-lit BLUs may be thinner, the light from each LED can spread across a large region of the LGP such that turning off individual LEDs or groups of LEDs may have only a minimal impact on the dynamic contrast ratio.

Accordingly, it would be advantageous to provide thin BLUs having improved local dimming efficiency without negatively impacting the uniformity of light emitted by the BLU. It would also be advantageous to provide backlights having a thinness similar to that of edge-lit BLUs while also providing local dimming capabilities similar to that of direct-lit BLUs.

SUMMARY

The disclosure relates, in various embodiments, to backlight units comprising a light guide plate having a first major surface, an opposing second major surface, and a plurality of light extraction features; at least one light source optically coupled to the second major surface of the light guide plate; a rear reflector positioned proximate the second major surface of the light guide plate; and a patterned reflective layer positioned proximate the first major surface of the light guide plate, the patterned reflective layer comprising at least one optically reflective component and at least one optically transmissive component. Display and lighting devices comprising such backlight units are also disclosed herein.

In certain embodiments, the LGP may comprise glass. The LGP can have a color shift Δy of less than about 0.015, an optical transmittance of at least 98% over a path length of 75 mm for wavelengths ranging from about 450 nm to about 650 nm, and/or a thickness ranging from about 0.1 mm to about 2 mm. The at least one light source may be optically coupled to the second major surface of the LGP through an optical adhesive layer which can, in some embodiments, have a refractive index within about 10% of the refractive index of the LGP. A first portion of light from the at least one light source can travel laterally along a length of the light guide plate due to total internal reflection, and a second portion of the light can travel laterally due to reflections between the patterned reflective layer and the rear reflector.

According to non-limiting embodiments, a first region of the patterned reflective layer positioned above the at least one light source comprises a greater density of optically reflective components than transmissive components. An optical reflectance of the first region may be at least about 92% in some embodiments. The patterned reflective layer may, for example, be disposed on the first major surface of the LGP, may comprise a patterned metallic film or a multi-layer dielectric coating, and/or may comprise a single layer or a composite layer.

In some embodiments, the light extraction features on the LGP can comprise light-scattering particles, laser-damaged sites, textural surface features, or combinations thereof. The light extraction features may be present on the first and/or second major surface of the LGP and/or within the matrix of the LGP. The first major surface of the LGP may, in non-limiting embodiments, further comprise a plurality of microstructures. These microstructures may be located in a region of the first major surface positioned above the at least one light source.

Additional features and advantages of the disclosure will be set forth in the detailed description which follows, and in part will be readily apparent to those skilled in the art from that description or recognized by practicing the methods as described herein, including the detailed description which follows, the claims, as well as the appended drawings.

It is to be understood that both the foregoing general description and the following detailed description present various embodiments of the disclosure, and are intended to provide an overview or framework for understanding the nature and character of the claims. The accompanying drawings are included to provide a further understanding of the disclosure, and are incorporated into and constitute a part of this specification. The drawings illustrate various embodiments of the disclosure and together with the description serve to explain the principles and operations of the disclosure.

BRIEF DESCRIPTION OF THE DRAWINGS

The following detailed description can be further understood when read in conjunction with the following drawings.

DETAILED DESCRIPTION

Disclosed herein are backlight units comprising a light guide plate having a first major surface, an opposing second major surface, and a plurality of light extraction features; at least one light source optically coupled to the second major surface of the light guide plate; a rear reflector positioned proximate the second major surface of the light guide plate; and a patterned reflective layer positioned proximate the first major surface of the light guide plate, the patterned reflective layer comprising at least one optically reflective component and at least one optically transmissive component. Display and lighting devices comprising such backlight units are also disclosed herein.

Devices comprising such backlights are also disclosed herein, such as display, lighting, and electronic devices, e.g., televisions, computers, phones, tablets, and other display panels, luminaires, solid-state lighting, billboards, and other architectural elements, to name a few.

Various embodiments of the disclosure will now be discussed with reference to FIGS. 1-7, which illustrate exemplary components and aspects of backlight units disclosed herein. The following general description is intended to provide an overview of the claimed devices, and various aspects will be more specifically discussed throughout the disclosure with reference to the non-limiting depicted embodiments, these embodiments being interchangeable with one another within the context of the disclosure.

Figure 1:
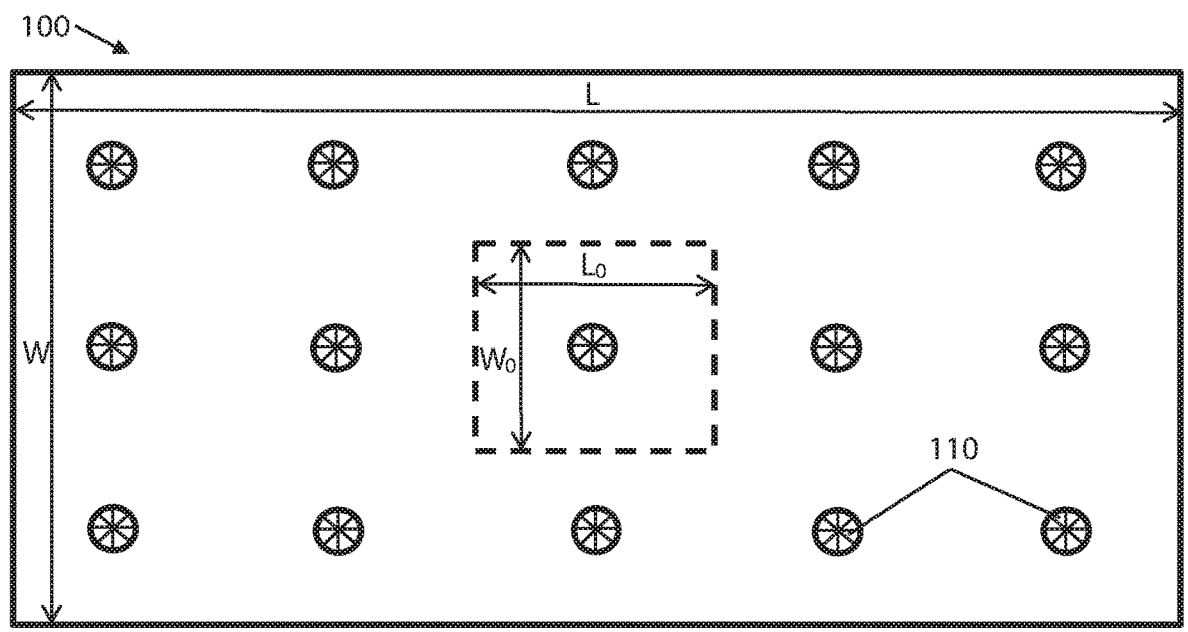
FIG. 1 illustrates a light guide plate and an array of light sources optically coupled to the light guide plate.

FIG. 1 illustrates a top view of an exemplary light guide plate (LGP) 100 and an array of light sources 110 optically coupled to the LGP 100. For illustrative purposes, the light sources 110 are visible through the LGP 100 in FIG. 1, although this may not be the case in some embodiments. Alternative configurations are also intended to fall within the scope of the disclosure, including different light source locations, sizes, shapes, and/or spacing. For instance, while the depicted embodiment includes a periodic or regular array of light sources 110 having the same size, shape, and spacing, other embodiments are contemplated in which the array is irregular or non-periodic.

The LGP 100 may have any dimensions, such as length L and width W, which can vary depending on the display or lighting application. In some embodiments, the length L can range from about 0.01 m to about 10 m, such as from about 0.1 m to about 5 m, from about 0.5 m to about 2.5 m, or from about 1 m to about 2 m, including all ranges and subranges therebetween. Similarly, the width W can range from about 0.01 m to about 10 m, such as from about 0.1 m to about 5 m, from about 0.5 m to about 2.5 m, or from about 1 m to about 2 m, including all ranges and subranges therebetween. Each light source 110 in the array of light sources may also define a unit block (represented by dashed lines) having an associated unit length $L_0$ and unit width $W_0$, which can vary depending on the dimensions of the LGP 100 and the number and/or spacing of the light sources 110 along the LGP 100. In non-limiting embodiments, the unit width $W_0$ and/or unit length $L_0$ may be less than or equal to about 150 mm, such as ranging from about 1 mm to about 120 mm, from about 5 mm to about 100 mm, from about 10 mm to about 80 mm, from about 20 mm to about 70 mm, from about 30 mm to about 60 mm, or from about 40 mm to about 50 mm, including all ranges and subranges therebetween. The length L and the width W of the LGP may, in some embodiments be substantially equal or they may be different. Similarly, the unit length $L_0$ and the unit width $W_0$ may be substantially equal or they may be different.

Of course, while a rectangular LGP 100 is illustrated in FIG. 1, it is to be understood that the LGP may have any regular or irregular shape as appropriate to produce a desired light distribution for a chosen application. The LGP 100 may comprise four edges as illustrated in FIG. 1, or may comprise more than four edges, e.g. a multi-sided polygon. In other embodiments, the LGP 100 may comprise less than four edges, e.g., a triangle. By way of a non-limiting example, the LGP may comprise a rectangular, square, or rhomboid sheet having four edges, although other shapes and configurations are intended to fall within the scope of the disclosure including those having one or more curvilinear portions or edges.

According to various embodiments, the LGP may comprise any transparent material used in the art for lighting and display applications. As used herein, the term "transparent" is intended to denote that the LGP has an optical transmission of greater than about 80% over a length of 500 mm in the visible region of the spectrum (~420-750 nm). For instance, an exemplary transparent material may have greater than about 85% transmittance in the visible light range over a length of 500 mm, such as greater than about 90%, greater than about 95%, or greater than about 99% transmittance, including all ranges and subranges therebetween. In certain embodiments, an exemplary transparent material may have an optical transmittance of greater than about 50% in the ultraviolet (UV) region (~100-400 nm) over a length of 500 mm, such as greater than about 55%, greater than about 60%, greater than about 65%, greater than about 70%, greater than about 75%, greater than about 80%, greater than about 85%, greater than about 90%, greater than about 95%, or greater than about 99% transmittance, including all ranges and subranges therebetween. According to various embodiments, the LGP can comprises an optical transmittance of at least 98% over a path length of 75 mm for wavelengths ranging from about 450 nm to about 650 nm.

The optical properties of the LGP may be affected by the refractive index of the transparent material. According to various embodiments, the LGP may have a refractive index ranging from about 1.3 to about 1.8, such as from about 1.35 to about 1.7, from about 1.4 to about 1.65, from about 1.45 to about 1.6, or from about 1.5 to about 1.55, including all ranges and subranges therebetween. In other embodiments, the LGP may have a relatively low level of light attenuation (e.g., due to absorption and/or scattering). The light attenuation (α) of the LGP may, for example, be less than about 5 dB/m for wavelengths ranging from about 420-750 nm. For instance, a may be less than about 4 dB/m, less than about 3 dB/m, less than about 2 dB/m, less than about 1 dB/m, less than about 0.5 dB/m, less than about 0.2 dB/m, or even less, including all ranges and subranges therebetween, e.g., from about 0.2 dB/m to about 5 dB/m.

The LGP 100 may comprise polymeric materials, such as plastics, e.g., polymethyl methacrylate (PMMA), methylmethacrylate styrene (MS), polydimethylsiloxane (PDMS), or other similar materials. The LGP 100 can also comprise a glass material, such as aluminosilicate, alkali-aluminosilicate, borosilicate, alkali-borosilicate, aluminoborosilicate, alkali-aluminoborosilicate, soda lime, or other suitable glasses. Non-limiting examples of commercially available glasses suitable for use as a glass light guide include, for instance, EAGLE XG®, Lotus™, Willow®, Iris™, and Gorilla® glasses from Corning Incorporated.

Some non-limiting glass compositions can include between about 50 mol % to about 90 mol % $SiO_2$, between 0 mol % to about 20 mol % $Al_2O_3$, between 0 mol % to about 20 mol % $B_2O_3$, and between 0 mol % to about 25 mol % $R_xO$, wherein R is any one or more of Li, Na, K, Rb, Cs and x is 2, or Zn, Mg, Ca, Sr or Ba and x is 1. In some embodiments, $R_xO-Al_2O_3>0$; $0<R_xO-Al_2O_3<15$; x=2 and $R_2O-Al_2O_3<15$; $R_2O-Al_2O_3<2$; x=2 and $R_2O-Al_2O_3-MgO>-15$; $0<(R_xO-Al_2O_3)<25$, $-11<(R_2O-Al_2O_3)<11$, and $-15<(R_2O-Al_2O_3-MgO)<11$; and/or $-1<(R_2O-Al_2O_3)<2$ and $-6<(R_2O-Al_2O_3-MgO)<1$. In some embodiments, the glass comprises less than 1 ppm each of Co, Ni, and Cr. In some embodiments, the concentration of Fe is <about 50 ppm, <about 20 ppm, or <about 10 ppm. In other embodiments, Fe+30Cr+35Ni<about 60 ppm, Fe+30Cr+35Ni<about 40 ppm, Fe+30Cr+35Ni<about 20 ppm, or Fe+30Cr+35Ni<about 10 ppm. In other embodiments, the glass comprises between about 60 mol % to about 80 mol % $SiO_2$, between about 0.1 mol % to about 15 mol % $Al_2O_3$, 0 mol % to about 12 mol % $B_2O_3$, and about 0.1 mol % to about 15 mol % $R_xO$, wherein R is any one or more of Li, Na, K, Rb, Cs and x is 2, or Zn, Mg, Ca, Sr or Ba and x is 1.

In other embodiments, the glass composition can comprise between about 65.79 mol % to about 78.17 mol % $SiO_2$, between about 2.94 mol % to about 12.12 mol % $Al_2O_3$, between about 0 mol % to about 11.16 mol % $B_2O_3$, between about 0 mol % to about 2.06 mol % $Li_2O$, between about 3.52 mol % to about 13.25 mol % $Na_2O$, between about 0 mol % to about 4.83 mol % $K_2O$, between about 0 mol % to about 3.01 mol % ZnO, between about 0 mol % to about 8.72 mol % MgO, between about 0 mol % to about 4.24 mol % CaO, between about 0 mol % to about 6.17 mol % SrO, between about 0 mol % to about 4.3 mol % BaO, and between about 0.07 mol % to about 0.11 mol % $SnO_2$.

In additional embodiments, the glass can comprise an $R_xO/Al_2O_3$ ratio between 0.95 and 3.23, wherein R is any one or more of Li, Na, K, Rb, Cs and x is 2. In further embodiments, the glass may comprise an $R_xO/Al_2O_3$ ratio between 1.18 and 5.68, wherein R is any one or more of Li, Na, K, Rb, Cs and x is 2, or Zn, Mg, Ca, Sr or Ba and x is 1. In yet further embodiments, the glass can comprise an $R_xO-Al_2O_3-MgO$ between −4.25 and 4.0, wherein R is any one or more of Li, Na, K, Rb, Cs and x is 2. In still further embodiments, the glass may comprise between about 66 mol % to about 78 mol % $SiO_2$, between about 4 mol % to about 11 mol % $Al_2O_3$, between about 4 mol % to about 11 mol % $B_2O_3$, between about 0 mol % to about 2 mol % $Li_2O$, between about 4 mol % to about 12 mol % $Na_2O$, between about 0 mol % to about 2 mol % $K_2O$, between about 0 mol % to about 2 mol % ZnO, between about 0 mol % to about 5 mol % MgO, between about 0 mol % to about 2 mol % CaO, between about 0 mol % to about 5 mol % SrO, between about 0 mol % to about 2 mol % BaO, and between about 0 mol % to about 2 mol % $SnO_2$.

In additional embodiments, the glass can comprise between about 72 mol % to about 80 mol % $SiO_2$, between about 3 mol % to about 7 mol % $Al_2O_3$, between about 0 mol % to about 2 mol % $B_2O_3$, between about 0 mol % to about 2 mol % $Li_2O$, between about 6 mol % to about 15 mol % $Na_2O$, between about 0 mol % to about 2 mol % $K_2O$, between about 0 mol % to about 2 mol % ZnO, between about 2 mol % to about 10 mol % MgO, between about 0 mol % to about 2 mol % CaO, between about 0 mol % to about 2 mol % SrO, between about 0 mol % to about 2 mol % BaO, and between about 0 mol % to about 2 mol % $SnO_2$. In certain embodiments, the glass can comprise between about 60 mol % to about 80 mol % $SiO_2$, between about 0 mol % to about 15 mol % $Al_2O_3$, between about 0 mol % to about 15 mol % $B_2O_3$, and about 2 mol % to about 50 mol % $R_xO$, wherein R is any one or more of Li, Na, K, Rb, Cs and x is 2, or Zn, Mg, Ca, Sr or Ba and x is 1, and wherein Fe+30Cr+35Ni<about 60 ppm.

In some embodiments, the LGP 100 can comprise a color shift Δy less than 0.015, such as ranging from about 0.005 to about 0.015 (e.g., about 0.005, 0.006, 0.007, 0.008, 0.009, 0.010, 0.011, 0.012, 0.013, 0.014, or 0.015). In other embodiments, the LGP can comprise a color shift less than 0.008. Color shift may be characterized by measuring variation in the x and y chromaticity coordinates along the length L using the CIE 1931 standard for color measurements. For LGPs the color shift Δy can be reported as $\Delta y = y(L_2) - y(L_1)$ where $L_2$ and $L_1$ are Z positions along the panel or substrate direction away from the source launch and where $L_2 - L_1 = 0.5$ meters. Exemplary LGPs have Δy<0.01, Δy<0.005, Δy<0.003, or Δy<0.001. According to certain embodiments, the LGP can have a light attenuation $\alpha_1$ (e.g., due to absorption and/or scattering losses) of less than about 4 dB/m, such as less than about 3 dB/m, less than about 2 dB/m, less than about 1 dB/m, less than about 0.5 dB/m, less than about 0.2 dB/m, or even less, e.g., ranging from about 0.2 dB/m to about 4 dB/m, for wavelengths ranging from about 420-750 nm.

The LGP 100 may, in some embodiments, comprise glass that has been chemically strengthened, e.g., ion exchanged. During the ion exchange process, ions within a glass sheet at or near the surface of the glass sheet may be exchanged for larger metal ions, for example, from a salt bath. The incorporation of the larger ions into the glass can strengthen the sheet by creating a compressive stress in a near surface region. A corresponding tensile stress can be induced within a central region of the glass sheet to balance the compressive stress.

Ion exchange may be carried out, for example, by immersing the glass in a molten salt bath for a predetermined period of time. Exemplary salt baths include, but are not limited to, $KNO_3$, $LiNO_3$, $NaNO_3$, $RbNO_3$, and combinations thereof. The temperature of the molten salt bath and treatment time period can vary. It is within the ability of one skilled in the art to determine the time and temperature according to the desired application. By way of a non-limiting example, the temperature of the molten salt bath may range from about 400° C. to about 800° C., such as from about 400° C. to about 500° C., and the predetermined time period may range from about 4 to about 24 hours, such as from about 4 hours to about 10 hours, although other temperature and time combinations are envisioned. By way of a non-limiting example, the glass can be submerged in a $KNO_3$ bath, for example, at about 450° C. for about 6 hours to obtain a K-enriched layer which imparts a surface compressive stress.

Figure 2:
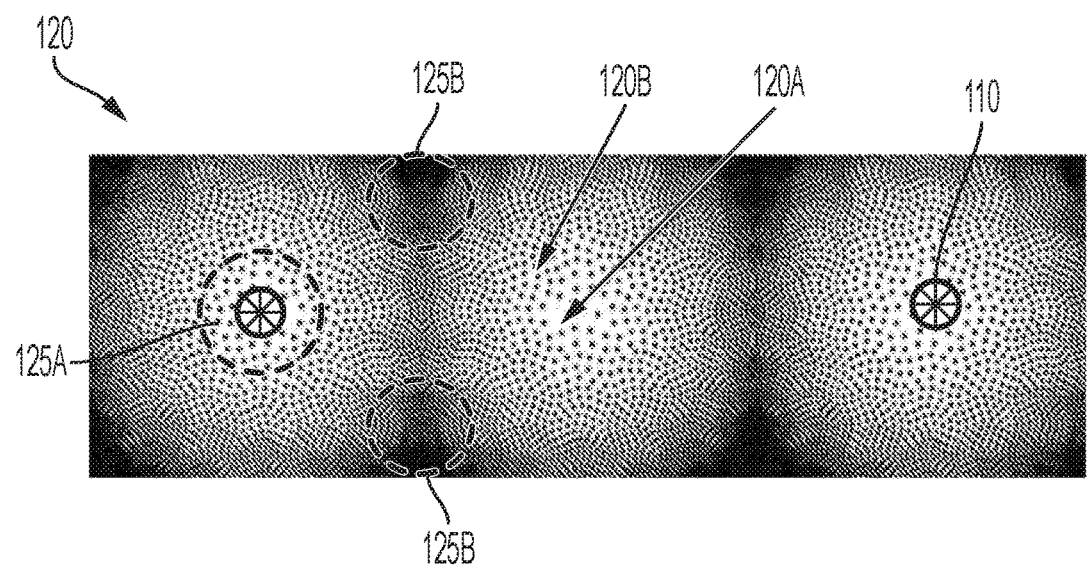
FIG. 2 illustrates an exemplary patterned reflective layer according to certain embodiments of the disclosure.

Referring to FIG. 2, which depicts a top view of an exemplary patterned reflective layer 120, the reflective layer may have at least two regions with different optical properties. For instance, the patterned reflective layer can comprise optically reflective components 120A (represented by white dots), which may have an optical reflectance that is higher than that of optically transmissive components 120B

(represented by black dots) and/or the transmissive components 120B may have an optical transmittance that is greater than that of the reflective components 120A. Again, for illustrative purposes, two exemplary light sources 110 are visible through the patterned reflective layer 120 in FIG. 2, although this may not be the case in some embodiments.

Reflective components 120A can include any material capable of reflecting light or otherwise blocking the transmission of light, such as metals, dielectric materials, inks, polymers, inorganic particles such as inorganic oxides, and the like. A transmissive component 120B can include any material through which light can be transmitted, such as optically clear, translucent, and/or transparent materials, e.g., glasses, polymers, transparent oxides, and other like materials. The transmissive component can also represent air, an empty space or gap, or a lack of reflective component. For instance, in a patterned metallic coating, the metallic coating can represent the reflective component 120A and the discontinuities or gaps in the metallic coating can represent the transmissive component 120B.

In certain embodiments, a first region 125A may be more densely populated with reflective components 120A in areas corresponding to at least one light source 110, as illustrated in FIG. 2. A second region 125B may similarly be more densely populated with transmissive components 120B in areas between the light sources 110, as illustrated in FIG. 2. Upon assembly, first regions 125A of high reflectance and/or low transmittance can be positioned above each discrete light source 110 in the array of light sources and second regions 125B of low reflectance and/or high transmittance may be positioned above areas adjacent or between the light sources. As used herein, the term "positioned above" is intended to denote that a given component or region is positioned in partial or complete overlying registration with the indicated component or region.

The patterned reflective layer 120 may comprise any layer, film, or coating capable of at least partially modifying the light output from the LGP 100. In some embodiments, the patterned reflective layer 120 may comprise a patterned metallic film, a multi-layer dielectric film, or any combination thereof. In certain instances, the reflective and transmissive components 120A, 120B and/or the first and second regions 125A, 125B of the patterned reflective layer 120 may have different diffuse or specular reflectance. In other embodiments, the patterned reflective layer 120 may adjust the amount of light transmitted by the LGP 100. For example, the reflective and transmissive components 120A, 120B and/or the first and second regions 125A, 125B of the patterned reflective layer 120 may have different optical transmittance.

According to various embodiments, a first reflectance of the first region 125A may be about 50% or greater and a second reflectance of the second region 125B may be about 20% or less. For example, the first reflectance may be at least about 50%, at least about 60%, at least about 70%, at least about 80%, at least about 90%, or at least about 92%, such as ranging from about 50% to 100%, including all ranges and subranges therebetween. The second reflectance may be about 20% or less, about 15% or less, about 10% or less, or about 5% or less, such as ranging from 0% to about 20%, including all ranges and subranges therebetween. In some embodiments, the first reflectance may be at least about 2.5 times greater than the second reflectance, e.g., about 3 times greater, about 4 times greater, about 5 times greater, about 10 times greater, about 15 times greater, or about 20 times greater, such as from about 2.5 to about 20 times greater, including all ranges and subranges therebetween. Reflectance of the patterned reflective layer 120 may be measured, for example, by a UV/Vis spectrometer available from Perkin Elmer.

In additional non-limiting embodiments, a first transmittance of the first region 125A may be about 50% or less and the second transmittance of second region 125B may be about 80% or greater. For example, the first transmittance may be about 50% or less, about 40% or less, about 30% or less, about 20% or less, or about 10% or less, such as ranging from 0% to about 50%, including all ranges and subranges therebetween. The second transmittance may be 80% or greater, about 85% or greater, about 90% or greater, or about 95% or greater, such as from about 80% to 100%, including all ranges and subranges therebetween. In some embodiments, the second transmittance may be at least about 1.5 times greater than the first transmittance, e.g., about 2 times greater, about 3 times greater, about 4 times greater, about 5 times greater, about 10 times greater, about 15 times greater, or about 20 times greater, such as from about 1.5 to about 20 times greater, including all ranges and subranges therebetween. Transmittance of the patterned reflective layer 120 may be measured, for example, by the UV/Vis spectrometer available from Perkin Elmer.

The reflective and/or transmissive components 120A, 120B may be positioned in the reflective layer 120 to produce any given pattern or design, which may, for example, be random or arranged, repetitive or non-repetitive, uniform or non-uniform. As such, while FIG. 2 illustrates an exemplary repeating pattern of reflective and transmissive components 120A, 120B, it is to be understood that other patterns, both regular and irregular, may be used and are intended to fall within the scope of the disclosure. In some embodiments, these components may form a gradient, e.g., a gradient of decreasing reflectance from the first region 125A to the second region 125B, from the light sources to the areas between the light sources, or from the center of each unit block to the edges and/or corners of each unit block. In additional embodiments, the reflective and transmissive components can form a gradient of increasing transmittance from the first region 125A to the second region 125B, from the light sources to the areas between the light sources, or from the center of each unit block to the edges and/or corners of each unit block, and so forth.

Figure 3:
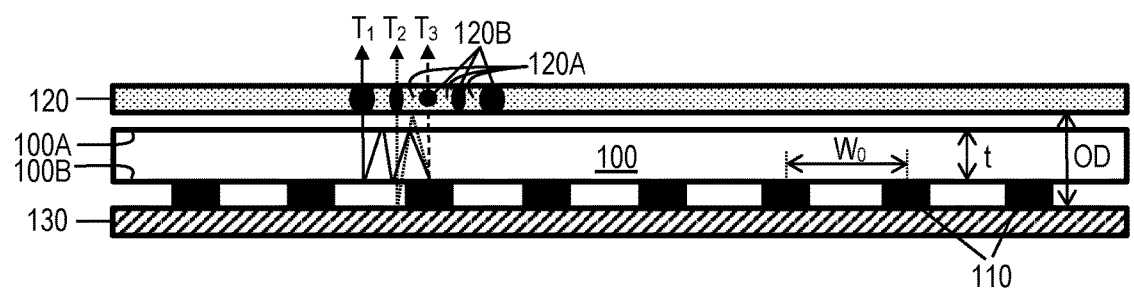
FIG. 3-4 illustrates a cross sectional view of exemplary BLUs according to various embodiments of the disclosure.

Referring to FIG. 3, which depicts a cross-sectional view of an exemplary BLU, the LGP 100 may comprise a first major surface 100A and an opposing second major surface 100B. According to various embodiments, the first major surface may be a light transmitting surface, e.g., facing the user, and the second major surface may be a rear-facing surface, e.g., facing away from the user. The major surfaces may, in certain embodiments, be planar or substantially planar and/or parallel or substantially parallel. In certain embodiments, the LGP 100 may have a thickness t extending between the first and second major surfaces of less than or equal to about 3 mm, for example, ranging from about 0.1 mm to about 2.5 mm, from about 0.3 mm to about 2 mm, from about 0.5 mm to about 1.5 mm, or from about 0.7 mm to about 1 mm, including all ranges and subranges therebetween.

The patterned reflective layer 120 may be positioned proximate the first major surface 100A of the LGP 100. As used herein, the term "positioned proximate" and variations thereof is intended to denote that a component or layer is located near a particular surface or listed component, but is not necessarily in direct physical contact with that surface or component. For instance, in the non-limiting embodiment depicted in FIG. 3, the patterned reflective layer 120 is not in direct physical contact with first major surface 100A, e.g., an air gap exists between these two components. However, in some embodiments, the patterned reflective layer 120 may be monolithically integrated with the LGP 100, such as disposed on the first major surface 100A of the LGP 100. As used herein, the term "disposed on" and variations thereof is intended to denote that a component or layer is in direct physical contact with a particular surface or listed component. In other embodiments, one or more layers or films may be present between these two components, such as an adhesive layer. As such, a component A positioned proximate a surface of component B may or may not be in direct physical contact with component B.

While FIG. 3 illustrates a single patterned reflective layer 120, it is to be understood that the reflective layer 120 may comprise multiple pieces, films, or layers. For example, the patterned reflective layer 120 can be a multi-layer composite film or coating. In other embodiments, portions of the reflective layer corresponding to the first regions 125A may first be applied the LGP 100, and portions of the reflective layer corresponding to the second regions 125B may subsequently be applied to the LGP, or vice versa. Alternatively, a first film or layer having first optical properties may be positioned over one or more portions of the LGP 100 and a second film or layer having second optical properties may be overlaid to cover substantially all of the LGP 100, including the portions covered by the first film. In such an embodiment, the first region 125A of the multi-layer reflective layer can have the aggregate optical properties of the first and second films while the second region 125B can have the optical properties of the second film alone, or vice versa. The patterned reflective layer 120 may thus comprise a single film or a composite film, a single layer or multiple layers, as appropriate to produce the desired optical effect.

Regardless of the patterned reflective layer configuration, it is to be understood that embodiments disclosed herein can comprise a patterned reflective layer having at least one optical property that is different in first regions 125A (e.g., higher reflectance and/or lower transmittance) as compared to second regions 125B (e.g., lower reflectance and/or higher transmittance). The areal density of the reflective and transmissive components 120A, 120B can vary across the reflective layer 120 such that a higher density of reflective components 120A is present in the first region 125A positioned above the light sources 110 and a higher density of transmissive components 120B is present in the second region 125B positioned above areas between the light sources 110. Furthermore, embodiments of BLUs disclosed herein may produce substantially uniform light, e.g., light emanating from regions corresponding to the light sources may have a luminance that is substantially equal to that of light emanating from regions between the light sources.

Figure 4:
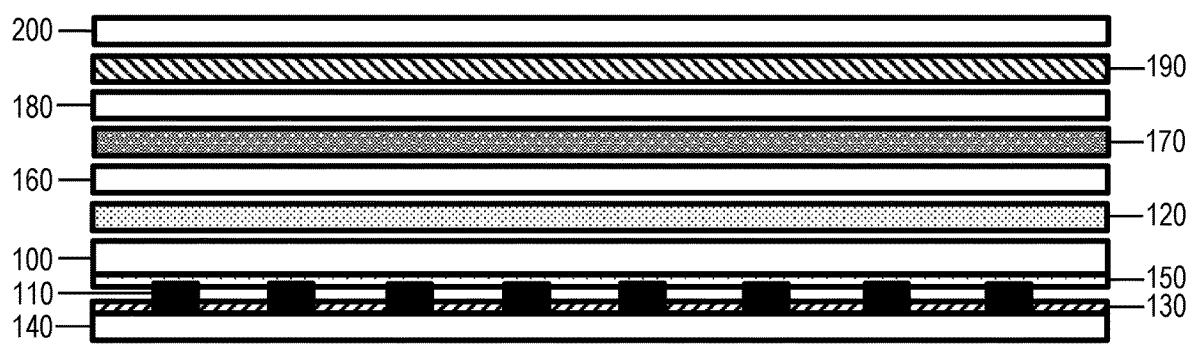

As shown in FIG. 3, the at least one light source 110 can be optically coupled to the second major surface 100B of the LGP 100. Non-limiting exemplary light sources can include light-emitting diodes (LEDs), e.g., LEDs emitting blue, UV, or near-UV light, e.g., light having wavelengths ranging from about 100 nm to about 500 nm. As used herein, the term "optically coupled" is intended to denote that a light source is positioned at a surface of the LGP so as to introduce light into the LGP that at least partially propagates due to total internal reflection. The light sources 110 may be in direct physical contact with the LGP 100 as illustrated in FIG. 3. However, a light source may also be optically coupled to the LGP even though it is not in direct physical contact with the LGP. For instance, an optical adhesive layer 150 may be used to adhere the light sources 110 to the second major surface 100B of the LGP 100 as depicted in FIG. 4. In certain embodiments, the optical adhesive layer may be index-matched to the LGP 100, e.g., having a refractive index within 10% of the refractive index of the LGP, such as within 5%, within 3%, within 2%, within 1%, or having the same refractive index as the LGP.

Referring again to FIG. 3, the BLU can further comprise a rear reflector 130 positioned proximate the second major surface 100B of the LGP 100. An optical distance OD for light traveling between the two reflectors may thus be defined as the distance between the patterned reflective layer 120 and the rear reflector 130. Exemplary rear reflectors 130 can comprise, for instance, metallic foils, such as silver, platinum, gold, copper, and the like; dielectric materials, e.g., polymers such as polytetrafluoroethylene (PTFE); and reflective inks, including white inorganic particles such as titania, barium sulfate, etc. As further illustrated in FIG. 4, a backlight unit may comprise one or more additional films or components, such as one or more supplemental optical films and/or structural components. Exemplary supplemental optical films 170 can include, but are not limited to, diffusing films, prismatic films, e.g., a brightness enhancing film (BEF), or reflective polarizing films, e.g., a dual brightness enhancing film (DBEF), to name a few. In some embodiments, the light sources 110 and/or rear reflector 130 may be disposed on a printed circuit board 140. Supplemental optical component(s), such as a diffusing film 160, a color-converting layer 170 (e.g., comprising quantum dots and/or phosphors), a prismatic film 180, and/or a reflective polarizing film 190, may be positioned between the patterned reflective layer 120 and a display panel 200. While not illustrated in FIG. 4, the BLUs disclosed herein may comprise or may be combined with other components typically present in display and lighting devices, such as a thin film transistor (TFT) array, a liquid crystal (LC) layer, and a color filter, to name a few exemplary components.

Referring back to FIG. 3, light rays emitted from light source 110 are depicted by dashed, dotted, and solid arrows. For illustrative purposes only, transmissive components 120B are depicted as dots with varying dimensions representative of their density along the light guide plate, e.g., with low density above the light source 110 and increasing density moving away from the light source 110. The density of the reflective and/or transmissive components 120A, 120B may be modified by increasing or decreasing the number and/or size of components. Moreover, the reflective and/or transmissive components 120A, 120B may have any shape or combination of shapes, including circles, ovals, squares, rectangles, triangles, or any other regular or irregular polygonal shape, including shapes with straight and/or curvilinear edges.

A first light ray (dashed arrow) injected into the LGP 100 can travel directly through the LGP without laterally propagating within the LGP 100 and may also pass through a transmissive component 120B of the patterned reflective layer 120 without being reflected back through the LGP, resulting in first transmitted light ray $T_1$. A second light ray (dotted arrow) injected into the LGP 100 can travel directly through the LGP without laterally propagating within the LGP 100, but may strike a reflective component 120A in the patterned reflective layer 120 and travel back through the LGP 100 to the rear reflector 130. The second light ray may thus traverse the optical distance OD one or more times while reflecting between the patterned reflective layer 120 and the rear reflector 130. Eventually, the second light ray will pass through a transmissive component 120B of the patterned reflective layer 120, resulting in second transmitted light ray $T_2$.

A third light ray (solid arrow) can be injected into the LGP 100 and may propagate within the LGP due to total internal reflection (TIR), until it strikes a light extraction feature or otherwise strikes a surface of the LGP at an angle of incidence that is less than the critical angle and is transmitted through the LGP. The optical distance traveled by the third light ray can thus be reduced to the thickness t of the LGP 100. While the third light ray may undergo some optical losses during TIR due to absorption by the LGP 100, such optical losses may be relatively small compared to those of the second light ray traveling optical distance OD because the third light ray travels shorter vertical and/or horizontal distances. In particular, the light rays tend to travel only about one half of the distance between light sources (pitch) before being extracted out of the LGP 100. In certain embodiments, the light source pitch can correspond to the unit width $W_0$ (illustrated) or unit length (not illustrated), which can be less than or equal to about 150 mm, or even less than about 80 mm, as discussed with reference to FIG. 1. Eventually, the third light ray will also pass through a transmissive component 120B of the patterned reflective layer, resulting in third transmitted light ray $T_3$.

Total internal reflection (TIR) is the phenomenon by which light propagating in a first material (e.g., glass, plastic, etc.) comprising a first refractive index can be totally reflected at the interface with a second material (e.g., air, etc.) comprising a second refractive index lower than the first refractive index. TIR can be explained using Snell's law:

$$n_1 \sin(\theta_i) = n_2 \sin(\theta_r)$$

which describes the refraction of light at an interface between two materials of differing indices of refraction. In accordance with Snell's law, $n_1$ is the refractive index of a first material, $n_2$ is the refractive index of a second material, $\Theta_i$ is the angle of the light incident at the interface relative to a normal to the interface (incident angle), and $\Theta_r$ is the angle of refraction of the refracted light relative to the normal. When the angle of refraction ($\Theta_r$) is 90°, e.g., $\sin(\Theta_r)=1$, Snell's law can be expressed as:

$$\theta_c = \theta_i = \sin^{-1}\left(\frac{n_2}{n_1}\right)$$

The incident angle $\Theta_i$ under these conditions may also be referred to as the critical angle $\Theta_c$. Light having an incident angle greater than the critical angle ($\Theta_i > \Theta_c$) will be totally internally reflected within the first material, whereas light with an incident angle equal to or less than the critical angle ($\Theta_i \leq \Theta_c$) will be transmitted by the first material.

In the case of an exemplary interface between air ($n_1=1$) and glass ($n_2=1.5$), the critical angle ($\Theta_c$) can be calculated as 41°. Thus, if light propagating in the glass strikes the air-glass interface at an incident angle greater than 41°, all the incident light will be reflected from the interface at an angle equal to the incident angle. If the reflected light encounters a second interface comprising an identical refractive index relationship as the first interface, the light incident on the second interface will again be reflected at a reflection angle equal to the incident angle.

According to various embodiments, the first and/or second major surface 100A, 100B of the LGP 100 may be patterned with a plurality of light extraction features. As used herein, the term "patterned" is intended to denote that the plurality of light extraction features is present on or under the surface of the LGP in any given pattern or design, which may, for example, be random or arranged, repetitive or non-repetitive, uniform or non-uniform. In other embodiments, the light extraction features may be located within the matrix of the LGP adjacent the surface, e.g., below the surface. For instance, the light extraction features may be distributed across the surface, e.g. as textural features making up a roughened or raised surface, or may be distributed within and throughout the LGP or portions thereof, e.g., as laser-damaged sites or features. Suitable methods for creating such light extraction features can include printing, such as inkjet printing, screen printing, microprinting, and the like, texturing, mechanical roughening, etching, injection molding, coating, laser damaging, or any combination thereof. Non-limiting examples of such methods include, for instance, acid etching a surface, coating a surface with $TiO_2$, and laser damaging the substrate by focusing a laser on a surface or within the substrate matrix.

The LGP may be treated to create light extraction features according to any method known in the art, e.g., the methods disclosed in co-pending and co-owned International Patent Application Nos. PCT/US2013/063622 and PCT/US2014/070771, each incorporated herein by reference in their entirety. For example, a surface of the LGP may be ground and/or polished to achieve the desired thickness and/or surface quality. The surface may then be optionally cleaned and/or the surface to be etched may be subjected to a process for removing contamination, such as exposing the surface to ozone. The surface to be etched may, by way of a non-limiting embodiment, be exposed to an acid bath, e.g., a mixture of glacial acetic acid (GAA) and ammonium fluoride ($NH_4F$) in a ratio, e.g., ranging from about 1:1 to about 9:1. The etching time may range, for example, from about 30 seconds to about 15 minutes, and the etching may take place at room temperature or at elevated temperature. Process parameters such as acid concentration/ratio, temperature, and/or time may affect the size, shape, and distribution of the resulting extraction features. It is within the ability of one skilled in the art to vary these parameters to achieve the desired surface extraction features.

While the light extraction feature pattern may be chosen to improve uniformity of light extraction along the length and width of the LGP 100, it is possible that the regions of the LGP corresponding to the individual light sources may transmit light having a higher intensity, e.g., the overall light output of the LGP may not be uniform. The patterned reflective layer 120 may thus be engineered with regions of varying optical properties to further homogenize the light output. For instance, the patterned reflective layer 120 may provide increased reflectance and/or decreased transmittance in first regions 125A corresponding to the light sources and increased transmittance and/or decreased reflectance in second regions 125B between the light sources. Such a configuration may allow for closer placement of the diffuser film or other optical films with respect to the light sources and, thus, a thinner overall BLU and resulting lighting or display device without negatively impacting the uniformity of light produced by the BLU or device.

In direct-lit BLU assemblies, as the optical distance between the rear reflector and the patterned reflective film becomes smaller, the number of light reflections increases, which results in increased optical losses. However, in the BLUs disclosed herein, the incorporation of an LGP optically coupled to the light sources can allow for the lateral spread of light along the length of the LGP with reduced optical losses as compared to a device relying solely on reflectors for the lateral spread of light.

For example, optical losses may be minimized by directly depositing or otherwise patterning a reflective material on an LGP (i.e., without any air gaps between the reflective material and the LGP) wherein the reflective material is patterned to enable diffuse reflection such as the pattern illustrated, for example, in FIG. 2. As used herein, the term "diffuse reflection" refers to reflection that includes at least some degree of light scattering, such that when a ray of light strikes the reflective material, the reflected rays are spread in many directions, at a variety of angles (as opposed to being reflected at a single angle that mirrors the angle at which the light strikes the reflector, referred to herein as the "mirror angle").

Figure 8:
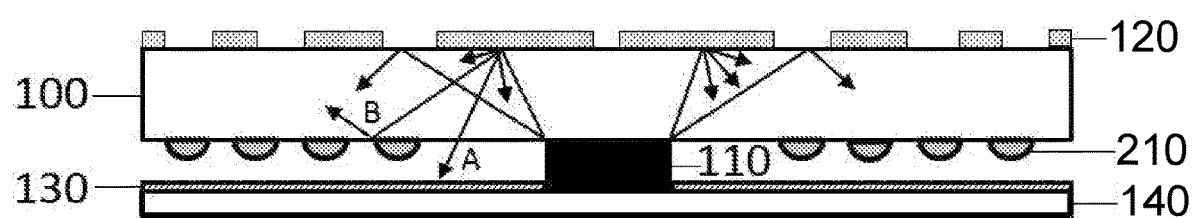
FIG. 8 illustrates a LGP in direct optical contact with a patterned reflective layer, wherein the patterned reflective layer enables diffuse reflection of light.

FIG. 8 illustrates how a reflective surface that is directly coupled to LGP 100 and patterned to enable diffuse reflection can minimize optical losses. Specifically, a patterned reflective layer 120 configured to enable diffuse reflection can cause light rays to be scattered at multiple angles and reflected in many directions. Many of these reflected light rays will be coupled into the LGP 100 and will propagate within the LGP by TIR without substantial loss (as shown, for example, by arrow B) until extracted by light extraction features 210. In contrast, light rays reflected at a mirror angle will tend to go through the LGP 100 to the rear reflector 130 (as shown, for example, by arrow A) and will likely experience multiple reflections between the patterned reflective layer 120 and the rear reflector 130 and will ultimately result in loss. Accordingly, embodiments that include a combination of direct optical contact between a patterned reflective layer 120 and a LGP 100, wherein the patterned reflective layer 120 enables diffuse reflection of light, can provide an advantage of achieving a high lateral spread of light while, at the same time, minimizing loss. And while FIG. 8 illustrates light extraction features 210 on the opposite side of LGP 100 as patterned reflective layer 120, embodiments disclosed herein include those in which light extraction features 210 are in one or more other locations, such as within LGP 100 and/or on the same side of LGP 100 as patterned reflective layer 120.

In a baseline assembly in which light is laterally spread only by reflectors, e.g., the assembly of FIG. 3 without a LGP, light with an incident angle ($\Theta$) may travel a lateral distance (X) over a vertical distance (d) by undergoing one or more reflections between the two reflective layers. The number (N) of reflections can be expressed by $N = X/d * \tan(\Theta)$. Assuming both reflectors have a reflectance of 98%, after N reflections the light will have a remaining power of $98\%^N$. Table 1 below shows the number of reflections and Table 2 shows the remaining percentage of light power for different combinations of incident angles ($\Theta$) and ratios X/d.

TABLE 1

Number of Reflections

| $\Theta$ (°)\X/d | 5 | 10 | 15 | 20 | 25 | 30 | 35 | 40 | 45 | 50 |
|---|---|---|---|---|---|---|---|---|---|---|
| 10 | 28 | 57 | 85 | 113 | 142 | 170 | 198 | 227 | 255 | 284 |
| 20 | 14 | 27 | 41 | 55 | 69 | 82 | 96 | 110 | 124 | 137 |
| 30 | 9 | 17 | 26 | 35 | 43 | 52 | 61 | 69 | 78 | 87 |
| 40 | 6 | 12 | 18 | 24 | 30 | 36 | 42 | 48 | 54 | 60 |
| 50 | 4 | 8 | 13 | 17 | 21 | 25 | 29 | 34 | 38 | 42 |
| 60 | 3 | 6 | 9 | 12 | 14 | 17 | 20 | 23 | 26 | 29 |
| 70 | 2 | 4 | 5 | 7 | 9 | 11 | 13 | 15 | 16 | 18 |
| 80 | 1 | 2 | 3 | 4 | 4 | 5 | 6 | 7 | 8 | 9 |

TABLE 2

Percentage of Remaining Power

| $\Theta$ (°)\X/d | 5 | 10 | 15 | 20 | 25 | 30 | 35 | 40 | 45 | 50 |
|---|---|---|---|---|---|---|---|---|---|---|
| 10 | 56% | 32% | 18% | 10% | 6% | 3% | 2% | 1% | 1% | 0% |
| 20 | 76% | 57% | 43% | 33% | 25% | 19% | 14% | 11% | 8% | 6% |
| 30 | 84% | 70% | 59% | 50% | 42% | 35% | 29% | 25% | 21% | 17% |
| 40 | 89% | 79% | 70% | 62% | 55% | 49% | 43% | 38% | 34% | 30% |
| 50 | 92% | 84% | 78% | 71% | 65% | 60% | 55% | 51% | 47% | 43% |
| 60 | 94% | 89% | 84% | 79% | 75% | 70% | 66% | 63% | 59% | 56% |

TABLE 2-continued

| | Percentage of Remaining Power | | | | | | | | | |
|---|---|---|---|---|---|---|---|---|---|---|
| θ (°)\X/d | 5 | 10 | 15 | 20 | 25 | 30 | 35 | 40 | 45 | 50 |
| 70 | 96% | 93% | 90% | 86% | 83% | 80% | 77% | 75% | 72% | 69% |
| 80 | 98% | 97% | 95% | 93% | 91% | 90% | 88% | 87% | 85% | 84% |

Light loss due to multiple reflections between the reflectors becomes noticeably significant as the ratio X/d increases. As noted above, the pitch between light sources can be as high as 150 mm. As the vertical distance decreases, the ratio X/d can quickly increase and, in many cases, will exceed 50. When X/d=50, the remaining power of light with incident angle Θ=10° is less than 1%.

Figure 5A:
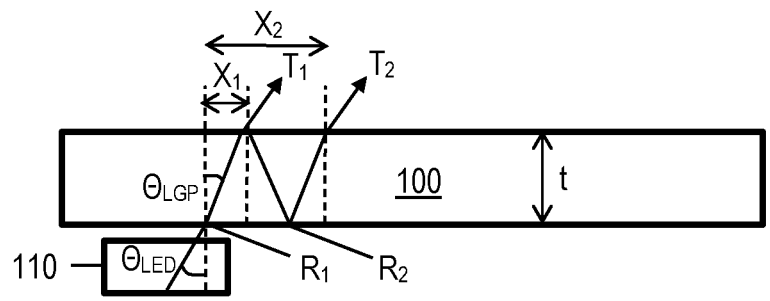
FIGS. 5A-B illustrate the lateral spreading of light within light guide plates.

With reference to FIG. 5A, a light ray is emitted from light source 110 at an emission angle $\Theta_{LED}$ and passes into the LGP 100. The light ray is incident upon the first major surface of the LGP at an incident angle $\Theta_{LGP}$, which does not exceed the critical angle $\Theta_C$ and therefore does not result in TIR within the LGP 100. A portion of the light travels a lateral distance $X_1$, expressed as $X_1 = t*\tan(\sin^{-1}(\sin(\Theta)/n))$, where n is the refractive index of the LGP and t is the thickness of the LGP 100, and is transmitted as first transmission $T_1$. A smaller portion of the light travels a second lateral distance $X_2$, expressed as $X_2 = 3X_1$, and is transmitted as second transmission $T_2$. Table 3 below lists the percent of luminous flux for the first reflection $R_1$, second reflection $R_2$, first transmission $T_1$, and second transmission $T_2$ for different emission angles $\theta_{LED}$=20°, 41°, and 60°, assuming the refractive index (n) of the LGP is 1.5. The higher order of the reflection $R_3$ and transmission $T_3$ (see FIG. 5B) is negligible as the total flux is less than 1%. Most of the light, independent of the emission angle, can only travel a lateral distance $X_1$ and is transmitted as $T_1$, and less than 1% of the light is transmitted as $T_2$. Even light transmitted as $T_2$ can only travel a maximum lateral distance of $X_2 = 3X_1$ in the depicted configuration.

TABLE 3

| | Luminous Flux Percentage | | | | | |
|---|---|---|---|---|---|---|
| $\Theta_{LED}$ (°) | $\Theta_{LGP}$ (°) | $R_1$ | $T_1$ | $R_2$ | $T_2$ | $R_3$ | $T_3$ |
| 20 | 13.2 | 4.0% | 92.1% | 3.7% | <1% | <1% | <1% |
| 41 | 25.9 | 4.7% | 90.9% | 4.2% | <1% | <1% | <1% |
| 60 | 35.3 | 8.9% | 83.0% | 7.4% | <1% | <1% | <1% |

Figure 5B:
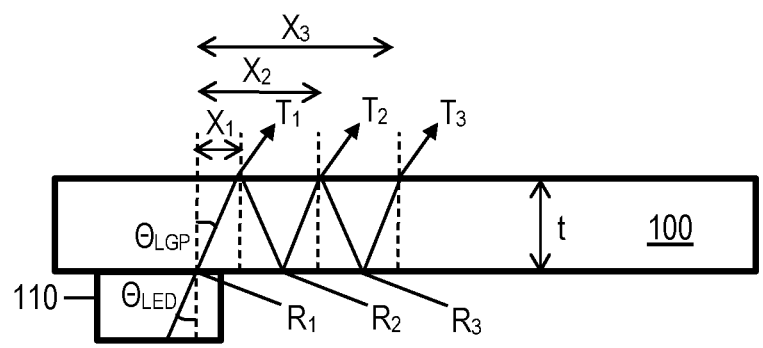
Figure 6A:
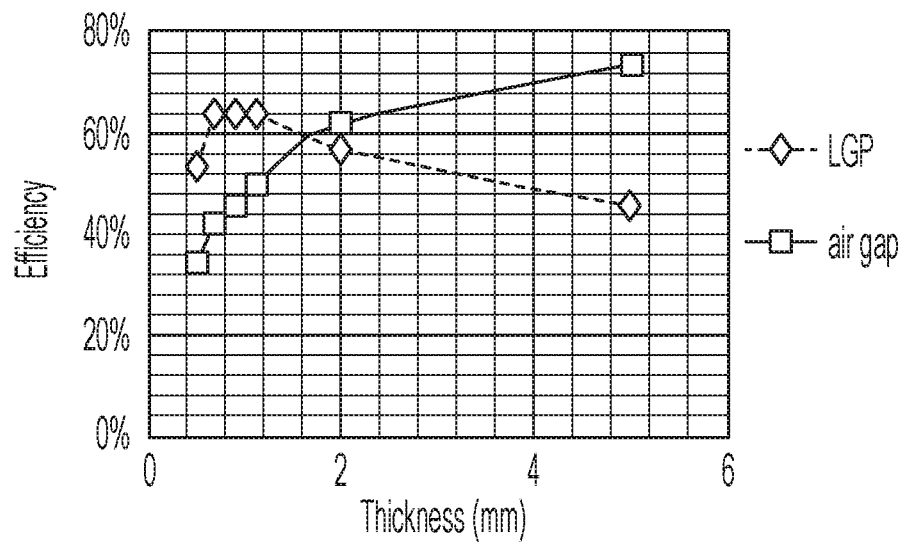
FIGS. 6A-D are plots of light power efficiency for exemplary BLUs with various patterned reflective layers.
Figure 6B:
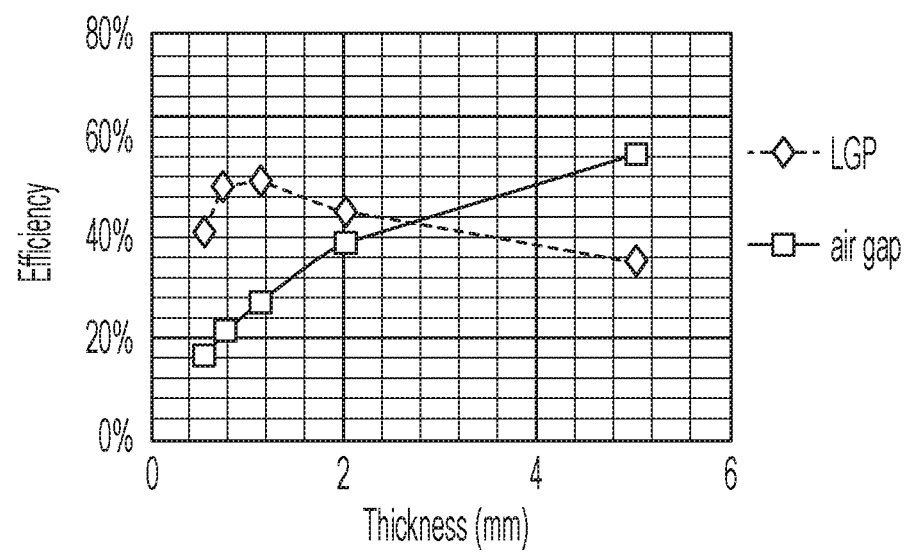
Figure 6C:
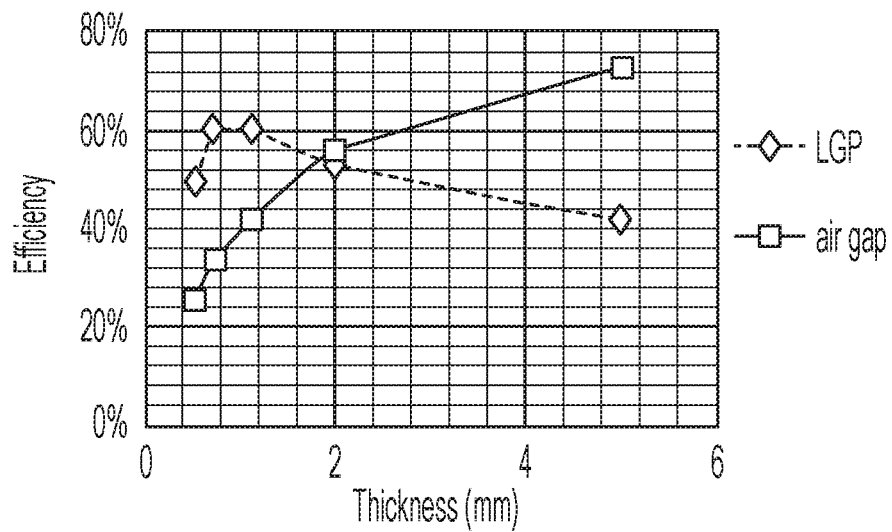
Figure 6D:
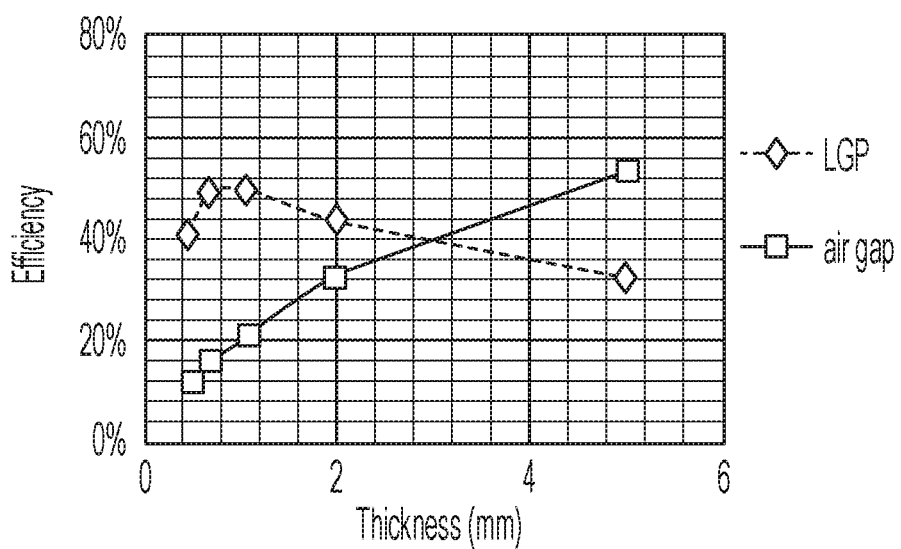

With reference to FIG. 5B, a light ray is emitted from a light source 110 optically coupled to LGP 100 such that the emission angle $\Theta_{LED}$ is substantially equal to the incident angle $\Theta_{LGP}$. The optical coupling, e.g., using an index-matched optical adhesive, allows at least a portion of the light to travel laterally along a length of the LGP due to TIR. A first portion of the light travels a lateral distance $X_1$, expressed as $X_1 = t*\tan(\Theta)$, where t is the thickness of the LGP 100, and is transmitted as first transmission $T_1$. A second portion of the light travels a second lateral distance $X_2$, expressed as $X_2 = 3X_1$ and is transmitted as second transmission $T_2$. Once the incident angle exceeds the critical angle, e.g., greater than about 42° in the depicted configuration, the light ray can undergo TIR, which allows the light to travel significantly greater lateral distances within the LGP before being extracted out. As such, a third portion of light can travel a lateral distance $X_3$ due to TIR and be transmitted as third transmission $T_3$.

Table 4 below lists the percent of luminous flux for the first reflection $R_1$, second reflection $R_2$, first transmission $T_1$, second transmission $T_2$, third reflection $R_3$, and third transmission $T_3$, for emission angles $\Theta_{LED}$=20° and 41°, assuming the refractive index (n) of the LGP is 1.5. In both Tables 3 and 4, most of the light is transmitted as $T_1$ for an emission angle $\Theta_{LED}$=20°. However, in Table 3 (no optical coupling), $X_1$=0.23t, and in Table 4 (optical coupling), $X_2$=0.36t, indicating that light with the same emission angle (20°) travels a longer lateral distance in the LGP that is optically coupled to the light source. For an emission angle $\Theta_{LED}$=41°, the light travels a much longer lateral distance in the optically coupled LGP (Table 4) as compared to the non-coupled LGP (Table 3), as suggested by the higher $T_2$ and $T_3$ values in Table 4.

TABLE 4

| | Luminous Flux Percentage | | | | | |
|---|---|---|---|---|---|---|
| $\Theta_{LED}$ (°) | $\Theta_{LGP}$ (°) | $R_1$ | $T_1$ | $R_2$ | $T_2$ | $R_3$ | $T_3$ |
| 20 | 20 | 0% | 95.8% | 4.0% | <1% | <1% | <1% |
| 41 | 41 | 0% | 62.0% | 23.6% | 8.9% | 3.4% | 1.3% |

Referring to FIGS. 6A-D, the effect of TIR on lateral light spread can further be demonstrated by comparing backlight assemblies comprising a rear reflector, a patterned reflector, at least one LED, and a LGP positioned between the reflectors. Four cases were studied, in which:
 a) the bottom reflector has a Lambertian reflectance of 98% and absorbance of 2%;
 b) the LED has a Lambertian reflectance of 60% and an absorbance of 40%;
 c) the LGP is optically coupled to the LED and comprises glass having a refractive index of 1.5 and a thickness varying from 0.1 mm to 5 mm; and
 d) the patterned reflector has one of four different properties:
 e) Case I: Specular reflectance of 98% and absorbance of 2% (FIG. 6A);
 f) Case II: Specular reflectance of 92% and absorbance of 8% (FIG. 6B);
 g) Case III: Lambertian reflectance of 98% and absorbance of 2% (FIG. 6C); or
 h) Case IV: Lambertian reflectance of 92% and absorbance of 8% (FIG. 6D).
 i) The above assemblies comprising LGPs were compared to identical assemblies without LGPs and instead comprising an air gap having a distance corresponding to the thickness of the LGP.

Referring to FIGS. 6A-D, which plot light power (or utilization) efficiency as a function of LGP/air gap thickness, in all four cases the light power efficiency of the assemblies comprising an air gap decreases as the thickness t decreases. In comparison, the light power efficiency of the assemblies comprising a LGP increases as the thickness t decreases from 5 mm to about 0.7 mm. In all cases, the light power efficiency of the assemblies comprising a LGP is significantly higher than that of the assemblies with an air gap for thicknesses of about 2 mm and below. As consumer demand for thinner display devices increases, modifications to decrease the overall thickness of the BLU are likewise desirable. By positioning an optically coupled LGP between the patterned reflective layer and the rear reflector, optical losses that may otherwise occur as the distance between the reflectors is decreased can be mitigated and the overall thickness of the BLU can be effectively reduced.

Figure 7:
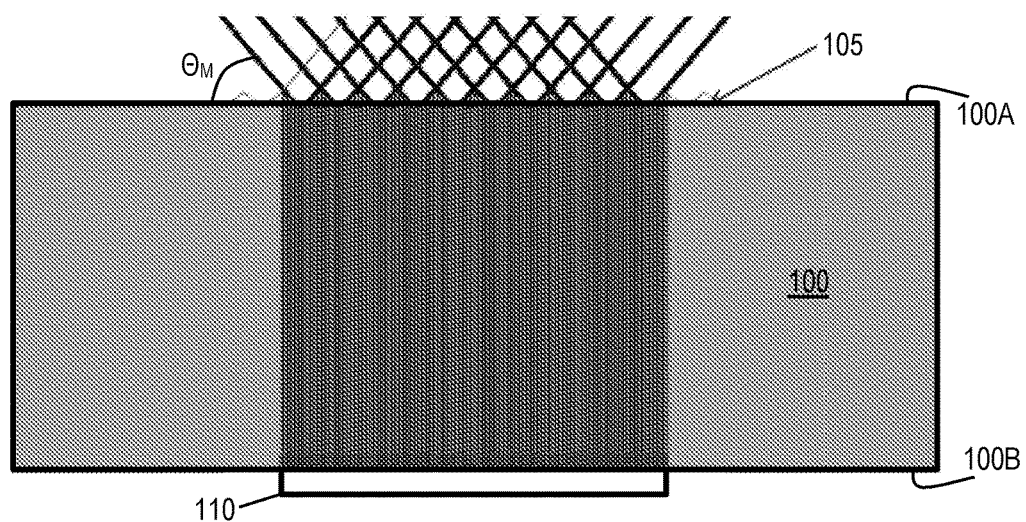
FIG. 7 illustrates a LGP patterned with microstructures according to additional embodiments of the disclosure.

In additional embodiments, such as the configuration depicted in FIG. 7, it may be desirable to include one or more microstructures 105 on the first major surface 100A of the LGP 100. These microstructures 105 can serve, in some embodiments, to redirect normal incidence light toward an off-axis angle to further encourage lateral spread of light from the light source and/or to reduce optical losses due to absorption by the light sources, e.g., LEDs. The light power efficiency may be improved in such embodiments as much as 5% as compared to configurations without microstructures on the LGP, such as ranging from about 1% to about 4%, or from about 2% to about 3%, including all ranges and subranges therebetween.

In certain embodiments, the microstructures 105 may have a pyramidal shape, which can be individual raised features (as illustrated) or linear grooves. Raised microstructures can be constructed, for instance, from the same or different material as the LGP, such as glasses and plastics. The raised microstructures can be made, for instance, by molding or microprinting the microstructures on the first major surface 100A. In further embodiments, the microstructures can be imprinted or etched into the first major surface 100A. According to further embodiments, the base angle $\Theta_M$ the microstructures make with the first major surface 100A can range from about 20° to about 40°, such as from about 25° to about 35°, or about 30°, including all ranges and subranges therebetween.

The BLUs disclosed herein may be used in various display devices including, but not limited to televisions, computers, phones, handheld devices, billboards, or other display screens. The BLUs disclosed herein may also be used in various illuminating devices, such as luminaires or solid state lighting devices.

It will be appreciated that the various disclosed embodiments may involve particular features, elements or steps that are described in connection with that particular embodiment. It will also be appreciated that a particular feature, element or step, although described in relation to one particular embodiment, may be interchanged or combined with alternate embodiments in various non-illustrated combinations or permutations.

It is also to be understood that, as used herein the terms "the," "a," or "an," mean "at least one," and should not be limited to "only one" unless explicitly indicated to the contrary. Thus, for example, reference to "a light source" includes examples having two or more such light sources unless the context clearly indicates otherwise. Likewise, a "plurality" or an "array" is intended to denote "more than one." As such, a "plurality of light scattering features" includes two or more such features, such as three or more such features, etc., and an "array of holes" includes two or more such holes, such as three or more such holes, and so on.

Ranges can be expressed herein as from "about" one particular value, and/or to "about" another particular value. When such a range is expressed, examples include from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially similar" is intended to denote that two values are equal or approximately equal. In some embodiments, "substantially similar" may denote values within about 10% of each other, such as within about 5% of each other, or within about 2% of each other.

While various features, elements or steps of particular embodiments may be disclosed using the transitional phrase "comprising," it is to be understood that alternative embodiments, including those that may be described using the transitional phrases "consisting" or "consisting essentially of," are implied. Thus, for example, implied alternative embodiments to a device that comprises A+B+C include embodiments where a device consists of A+B+C and embodiments where a device consists essentially of A+B+C.

It will be apparent to those skilled in the art that various modifications and variations can be made to the present disclosure without departing from the spirit and scope of the disclosure. Since modifications combinations, sub-combinations and variations of the disclosed embodiments incorporating the spirit and substance of the disclosure may occur to persons skilled in the art, the disclosure should be construed to include everything within the scope of the appended claims and their equivalents.

What is claimed is:

1. A backlight unit comprising:
   a light guide plate comprising a first major surface, an opposing second major surface, and a plurality of light extraction features;
   at least one light source optically coupled to the second major surface of the light guide plate;
   a rear reflector positioned proximate the second major surface of the light guide plate; and
   a patterned reflective layer positioned proximate the first major surface of the light guide plate, the patterned reflective layer comprising at least one optically reflective component and at least one optically transmissive component.

2. The backlight unit of claim 1, wherein the light guide plate comprises glass.

3. The backlight unit of claim 2, wherein the glass comprises the following composition, on a mol % oxide basis:
   50-90 mol % $SiO_2$,
   0-20 mol % $Al_2O_3$,
   0-20 mol % $B_2O_3$, and
   0-25 mol % $R_xO$,
   wherein x is 2 and R is chosen from Li, Na, K, Rb, Cs, and combinations thereof, or wherein x is 1 and R is chosen from Zn, Mg, Ca, Sr, Ba, and combinations thereof.

4. The backlight unit of claim 1, wherein the light guide plate comprises a color shift Δy of less than about 0.015.

5. The backlight unit of claim 1, wherein the light guide plate comprises an internal transmission of at least 98% over a path length of 75 mm for wavelengths ranging from about 450 nm to about 650 nm.

6. The backlight unit of claim 1, wherein the light guide plate comprises a thickness ranging from about 0.1 mm to about 2 mm.

7. The backlight unit of claim 1, wherein the at least one light source is optically coupled to the second major surface of the light guide plate through an optical adhesive layer.

8. The backlight unit of claim 7, wherein the optical adhesive layer has a refractive index within 10% of a refractive index of the light guide plate.

9. The backlight unit of claim 1, wherein a first portion of light from the at least one light source travels laterally along a length of the light guide plate due to total internal reflection, and a second portion of the light travels laterally due to reflections between the patterned reflective layer and the rear reflector.

10. The backlight unit of claim 1, wherein a first region of the patterned reflective layer positioned above the at least one light source comprises a greater density of optically reflective components than optically transmissive components.

11. The backlight unit of claim 10, wherein an optical reflectance of the first region is at least about 92%.

12. The backlight unit of claim 1, wherein the patterned reflective layer is disposed on the first major surface of the light guide plate.

13. The backlight unit of claim 12, wherein the patterned reflective layer comprises a patterned metallic film or a multi-layer dielectric coating.

14. The backlight unit of claim 1, wherein the patterned reflective layer comprises a single layer or a composite layer.

15. The backlight unit of claim 1, wherein the plurality of light extraction features is present on the first major surface of the light guide plate, on the second major surface of the light guide plate, within the matrix of the light guide plate, or any combination thereof.

16. The backlight unit of claim 1, wherein the light extraction features comprise light-scattering particles, laser-damaged sites, textural surface features, or combinations thereof.

17. The backlight unit of claim 1, wherein the light guide plate further comprises a plurality of microstructures on the first major surface.

18. The backlight unit of claim 17, wherein the plurality of microstructures is located in a region of the first major surface positioned above the at least one light source.

19. The backlight unit of claim 1, further comprising at least one of a diffusing film, a prismatic film, a color converting film, and a reflective polarizing film.

20. A display or lighting device comprising the backlight unit of claim 1.

21. The backlight unit of claim 1, further comprising an air gap between the first major surface of the light guide plate and the patterned reflective layer.

* * * * *